United States Patent
Blum et al.

[11] 4,045,286
[45] Aug. 30, 1977

[54] MOLTEN FUEL-SALT REACTOR

[75] Inventors: Jacques Marcel Blum, Levallois Perret; Michel Grenon, Neuilly-sur-Seine; Edmond Ventre, Le Vesinet, all of France

[73] Assignees: Electricite de France (Service National); Pechiney Ugine Kuhlmann, both of Paris, France

[21] Appl. No.: 642,996

[22] Filed: Dec. 22, 1975

[30] Foreign Application Priority Data

| Dec. 24, 1974 | France | 74.42767 |
| Nov. 17, 1975 | France | 75.35055 |

[51] Int. Cl.² .............................................. G21C 3/54
[52] U.S. Cl. ..................................... 176/49; 176/62; 176/65
[58] Field of Search .................. 176/49, 65, 62, 63, 176/40, 37, 64

[56] References Cited

U.S. PATENT DOCUMENTS

| 3,287,227 | 11/1966 | Ackroyd et al. | 176/40 |
| 3,383,287 | 5/1968 | Jackson | 176/40 |
| 3,494,829 | 2/1970 | Mialki et al. | 176/46 |
| 3,743,577 | 7/1973 | Bettis et al. | 176/49 |

FOREIGN PATENT DOCUMENTS

| 1,908,908 | 9/1969 | Germany | 176/38 |

*Primary Examiner*—Verlin R. Pendegrass
*Assistant Examiner*—Ralph Palo
*Attorney, Agent, or Firm*—Cameron, Kerkam, Sutton, Stowell & Stowell

[57] ABSTRACT

In a molten-salt reactor, a common vessel contains the reactor core, a neutron-moderating mass pierced by passages for the circulation of the fuel salt, at least one primary heat exchanger which is located close to the reactor core and through which the hot fuel salt passes after discharge from the core, pumps for circulating the cold fuel salt from the heat exchangers back into the reactor core. The free spaces defined within the reactor vessel between the core, the heat exchangers and the pumps except for the passages in which the molten fuel salt is circulated are packed with material which is compatible with the fuel salt.

4 Claims, 3 Drawing Figures

MOLTEN FUEL-SALT REACTOR

This invention relates to a nuclear reactor in which the fuel is provided in the form of a molten salt and is more particularly concerned with an arrangement of the reactor block which serves to limit to strictly necessary values both the length and bulk of the circuit followed by the high-temperature molten salt which is discharged from the reactor core and consequently to reduce the thermal stresses and chemical corrosion of metallic components employed in the construction of the reactor.

The conceptual design and technology of molten salt reactors are already known. These reactors make use of a fuel in liquid form which is brought to a high temperature of the order of at least 600° C as a result of nuclear fission within the reactor core. As a general rule, this fuel consists of plutonium or uranium fluoride or alternatively a mixture of uranium and thorium fluoride dissolved in fluorides of lithium-7 and beryllium; the eutectic mixture thus formed consequently has a relatively low melting point, suitable fluidity and low vapor tension. In a reactor of this type, provision is made within the core for a mass of suitable neutron-moderating material usually consisting of graphite in which are formed ducts for the flow of the fuel salt; the heat gained by this latter as it passes through the reactor core is exchanged in at least one primary heat exchanger with another molten salt or so-called buffer salt such as sodium fluoborate, for example. Said buffer salt in turn exchanges its heat in a secondary circuit comprising a steam generator, the steam being finally expanded in an electric power generating plant.

Reactors of this type are capable of operating with a flux of thermal neutrons or a flux of fast neutrons according to the composition of the salt, the distribution of the salt within the reactor core and the nature of the moderator. The fuel salt can be burnt in the reactor core with a periodic readjustment of the fuel concentration whilst processing of this latter and in particular the extraction of fission products are carried out only after a predetermined period of operation. In another design concept, the fission products and especially the gaseous products are continuously withdrawn by a method of chemical bubbling with concomitant adjustment of the fuel salt concentration. Finally, in the case of operation as a breeder reactor, the fuel salt is processed so as to permit continuous removal of protactinium-233 by liquid bismuth followed by metallic reduction by thorium and intermediate storage so as to permit radioactive decay and conversion to uranium-233 in the state of fluoride which is then returned to the main primary circuit (Revue Energie Nucléaire — vol. 13 No 2 — March, 1971 — "Les reacteurs a sels fondus" — (Molten-salt reactors) — M. Grenon and J-J. Geist).

In these conventional design concepts, the three essential components of the primary molten fuel-salt circuit, namely the reactor core, the primary heat exchangers and the pumps for circulating the fuel within said circuit are connected to each other by means of piping systems forming one or a number of loops located outside the vessel which contains the reactor core. These piping systems must have a sufficient degree of flexibility in order to maintain thermal stresses at an acceptable level. Moreover, in designs of this type which are at present known, the pumps are placed either in the hot branch of said loops for collecting the molten fuel salt at the outlet of the reactor core or in the cold branch at the outlets of the primary heat exchangers. In point of fact, these solutions have a disadvantage in that a substantial portion of the primary circuit is placed in contact with the fuel salt at its maximum temperature; this accordingly produces not only an increase in thermal stresses but also an aggravation of the problems presented by chemical corrosion of structures by the molten salt since the corrosive action of this latter increases very rapidly as the temperature rises.

The present invention relates to a nuclear reactor of the type aforementioned in which the primary circuit is directly integrated in the vessel containing the reactor core, thus circumventing the disadvantages outlined in the foregoing. In particular, said primary circuit is provided within a common vessel containing the reactor core and a neutron-moderating mass pierced by passages for the circulation of the molten fuel salt with at least one primary heat exchanger which is located as close as possible to the reactor core and through which the hot fuel salt passes immediately after discharge from said core and with pumps for circulating the cold molten fuel salt which is discharged from the heat exchangers and returned into the reactor core.

In accordance with the invention, the molten fuel salt reactor of the type described above is distinguished by the fact that the free spaces defined within the reactor vessel between the core, the heat exchangers and the pumps are filled with an inert material which is compatible with the molten fuel salt except for the passages in which the fuel salt is circulated.

The arrangement adopted consists especially in mounting within a common vessel both the reactor core, the heat exchangers and the pumps for circulating the fuel salt which is discharged from said heat exchangers and returned to the core. Accordingly, the useful volume of the molten fuel salt which is heated to the maximum temperature of the cycle can be reduced to the strict minimum; the primary heat exchanger or exchangers or the separate units constituting said exchangers can be connected directly to the core outlet by means of passages of small dimensions while the assembly formed by the reactor, the heat exchangers and the pumps is placed within a single container or vessel which surrounds the entire primary circuit. In consequence, the metallic structures or other structures which are subjected to the most arduous operating conditions and placed in particular in contact with the hot fuel salt are limited to the greatest possible extent. Thus most of the primary circuit is only in contact with the cold fuel salt for which connecting passages are also provided, the dimensions of said passages being calculated as a function of the requirements of hydraulic operation of the system. Moreover, the integrated reactor concept results in containment of the molten fuel salt within a vessel of simple shape which is conducive to cooling and heat insulation.

In a particular embodiment of the invention, the reactor core is placed within the central portion of an open vessel having a vertical axis and is surrounded by a lateral reflector which defines an annular region with the internal vessel wall, the pumps for the circulation of molten fuel salt and the heat exchangers being placed within said annular region, said pumps and said heat exchangers being disposed at uniform intervals around the reactor core.

In accordance with a particular feature of the first embodiment aforementioned, the pumps and heat exchangers are suspended within the annular space beneath a horizontal vault roof extending above the reactor vessel, said vault roof being provided with a central access opening placed opposite to the reactor core and closed by a removable shield plug.

In another alternative embodiment which permits a further reduction in overall length and dimensions of the connecting passages provided for the molten fuel salt discharged from the reactor core, each circulating pump is directly mounted beneath a heat exchanger within the annular space so as to constitute a pump-exchanger unit, the passages providing a connection with the reactor core being constituted by ducts formed radially from the axis of the reactor vessel and placed in the top and bottom portions of the reactor core.

Whatever design may be adopted for the primary circuit and whatever in particular may be the relative arrangement of the components of said circuit, the inert material which is compatible with the molten fuel salt and fills the spaces left free between the reactor core, the heat exchangers and the pumps in order to limit the useful volume in circulation is constituted by expanded graphite.

The use of graphite within a molten-salt reactor vessel has already been contemplated. However, in known designs, this material is provided in the form of impregnated blocks but this is attended by two disadvantages: on the one hand, said blocks are costly and, on the other hand, they result in local temperature rises which are liable in some cases to be prohibitive. In fact, when the free spaces formed for example within the annular region around the reactor core between the pumps and the heat exchangers are filled with graphite blocks, it is not possible to prevent the presence of thin layers of fuel salt which lie stagnant between the adjacent faces of said blocks, especially as a result of clearance-spaces formed at the time of assembly and operation. Under these conditions, the nuclear components of said salts which are exposed to the environmental neutron radiation give rise to nuclear reactions, thus releasing thermal energy which cannot be removed by conduction through the graphite since this latter usually has low heat conductivity. In some cases, the temperatures attained can be of a high order and prove detrimental to the good operation of the installation since they are liable to result in serious damage to some reactor vessel structures or the internal components of said vessel.

The utilization of expanded graphite makes it possible on the contrary to overcome these disadvantages. This graphite is preferably obtained from grains of lamellar complexes of graphite abruptly subjected to a substantial temperature rise so as to produce a thermal shock which results in the conversion of said grains to flakes. Said flakes are then compacted so as to form blocks or graphite agglomerates having a density which can range from 0.1 to 2 according to the compacting pressure adopted. In particular, the compacting can be carried out by isostatic or unidirectional compression, depending on the nature of the end product to be obtained and the design of the fabrication means employed.

One remarkable advantage of expanded graphite results from the possibility of forming lightweight compact blocks or masses, the faces of which are practically impermeable to liquids which have a high surface tension. This is precisely the case of the molten fuel salt which is circulated within the reactor in contact with said blocks and fills the free spaces in the reactor vessel. It is worthy of note that these free spaces, in particular in the annular region provided within the reactor vessel between this latter and the reactor core, can be occupied by expanded graphite which is compacted in situ to a predetermined density without preliminary annealing and especially in zones of complex shape, for example around the connecting passages through which the molten fuel salt is circulated. Said passages which connect the reactor core to the heat exchangers and to the circulating pumps can be formed in the mass of expanded graphite either by forming spaces having the requisite size at the time of filling of the reactor vessel or by employing tubes of dense graphite around which the graphite packing is then compacted.

It should finally be noted that the use of expanded graphite does not introduce any dimensional limitation in the mass of graphite employed and consequently makes it possible to dispense with joints between blocks in those zones in which the neutron flux density would result in unacceptable temperatures in the fuel salt which is trapped in said joints. If necessary, said mass can be arranged so as to permit slight circulation of the fuel salt and thus prevent stagnation of this latter.

Further properties of a molten-salt reactor in accordance with the invention will become apparent from the following description of two embodiments which are given solely by way of example without any limitation being implied, reference being made to the accompanying drawings, wherein.

Figure 1:
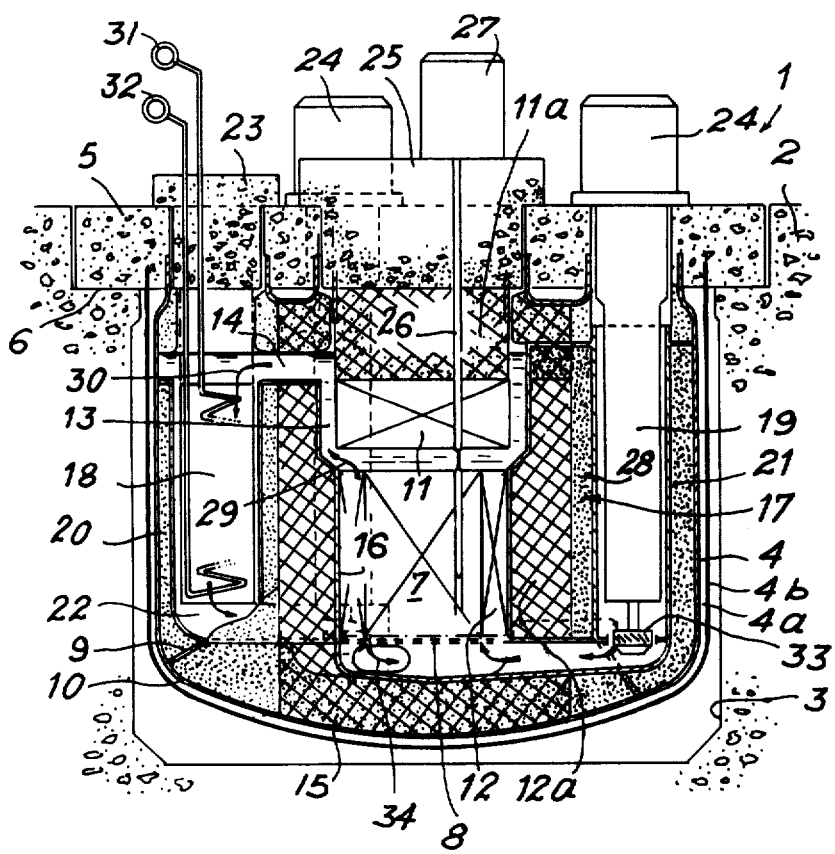
FIG. 1 is a longitudinal sectional view in elevation showing a first embodiment of a nuclear reactor in accordance with the invention.

The molten-salt reactor which is illustrated diagrammatically in FIG. 1 is generally designated by the reference 1. The reactor comprises an outer containment structure 2 having concrete walls of substantial thickness defining an internal cavity or vault 3 and an inner cylindrical vessel 4 having a substantially spherical bottom wall and a vertical axis. Said vessel contains the reactor core and the entire primary circuit which is associated with the core. The external surface of the reactor vessel 4 is advantageously surrounded by a second vessel 4a having parallel walls, the space 4b formed between the two vessels being filled with a suitable conditioning fluid. The open top portions of the vessels 4 and 4a are suspended from a closure slab or vault roof 5 which extends horizontally and rests on a bearing surface or corbel 6 formed in the outer containment structure 2. The reactor core 7 is placed in the axis of the vessel 4 in the lower portion of this latter and rests on a diagrid 8 which is in turn carried on a transverse support structure 9, the peripheral portion of said support structure being rigidly fixed to the bottom wall 10 of the vessel 4. The reactor core 7 is formed of a neutron-moderating mass, especially of graphite, which is pierced by ducts (not shown in the drawings) for the circulation of molten salt. The top portion of the reactor core 7 is surmounted by a reflector 11 and surrounded laterally by another reflector 12, said reflectors being in turn surrounded by a suitable thickness of a mass of material designated respectively by the references 11a and 12a and designed to form a neutron shield. There is formed between these core components and above the reactor core at least one narrow passage 13 through which the molten fuel salt passes and collects in a top region 14 forming a manifold after said fuel salt has been circulated upwards through the reactor by means which will be described later. There is placed beneath the reactor core a bottom reflector 15 which is intended in conjunction with the other reflectors to confine the neutrons in the active portion of the reactor. The reactor core 7 and the lateral reflector 12 are placed within a thin-walled open vessel 16 which is placed within the first vessel 4 and rests on the transverse support structure 9 of this latter. An annular region 17 is formed between said second vessel 16 and the internal wall of the first vessel; the top portion of said annular region communicates with the manifold 14 for the hot molten fuel salt which is discharged from the reactor core via the passage 13, there being placed within said annular region the means for circulating the fuel salt and for extracting the heat gained during circulation of this latter through the reactor core.

A number of heat exchangers 18 and circulating pumps 19 are in fact mounted in the annular region 17. These primary circuit components are arranged in suitably spaced relation so as to ensure the most favorable conditions for temperature equilibrium and fluid circulation. The heat exchangers and the pumps are surrounded by cylindrical protective shells or sleeves 20 and 21 respectively which extend to the top portion of the vessel 4 so as to be supported by the roof slab 5 which closes said vessel. The top portions of the sleeves 20 and 21 open into the manifold 14 and the bottom portions thereof communicate with a second manifold 22 in which the cold fuel salt discharged from the heat exchangers is recirculated by the pumps and returned to the reactor core beneath the reactor diagrid 8. The heat exchangers 18 are suspended from seal plugs 23 which serve to close-off openings formed in the vault roof and having suitable dimensions whilst the pumps 19 are in turn suspended from seal plugs 24 which contain the motors for driving said pumps. The vault roof 5 is also provided in the central portion and above the reactor core 7 with a removable seal plug 25 which serves to gain access to the core through the neutron shield 11a and the top reflector 11 by means of handling devices 26 which are controlled from the exterior of the reactor vessel by actuating means 27.

In accordance with a characteristic arrangement of the invention, the annular region 17 formed between the vessels 4 and 16 is packed within the free spaces located outside the sleeves 20 and 21 which surround the heat exchangers 18 and the pumps 19 with an inert material 28 which is compatible with the molten fuel salt and preferably consists of expanded graphite. Both the bottom portion of the vessel 4 and the region located at the top portion of this latter beneath the vault roof 5 above and beneath the manifolds 14 and 22 are also filled with molten fuel salt.

The circulation of the molten fuel salt within the primary circuit constituted by the reactor core 7, the heat exchangers 18, the pumps 19, the manifolds 14 and 22 takes place as follows. The hot fuel salt discharged from the top portion of the reactor core is collected by the passage 13, then flows within this latter towards the manifold 14 in the direction of the arrows 29. In this region, the fuel salt is fed to the heat exchangers 18 in the direction of the arrows 30 and restitutes the heat gained at the reactor core outlet to a suitable secondary fluid which is circulated within the heat exchangers through pipes 31 and 32 respectively. The cold salt is then collected in the outlet manifold 22 to be recirculated by the impellers 33 of the pumps 19 which return the salt beneath the reactor core for a further passage through this latter. The direction of circulation of the fuel salt in this final portion of its path is shown diagrammatically by the arrows 34.

The arrangements contemplated for the outley of the primary circuit within the reactor vessel thus consist in reducing the dimensions of the molten salt flow path to a strict minimum, this result being achieved by judicious packing of the spaces which are left free between the pumps and the heat exchangers within the annular region which surrounds the reactor core and around the hot salt manifolds and cold salt manifolds. In particular, that portion of said flow path in which the fuel salt is brought to its highest temperature, that is, between the core outlet and the heat-exchanger inlet and delimited by the passage 13 and the manifold 13 corresponds to a small length in which the effects of corrosion of the fuel salt on the vessel structures can be limited to a permissible value.

Figure 2:
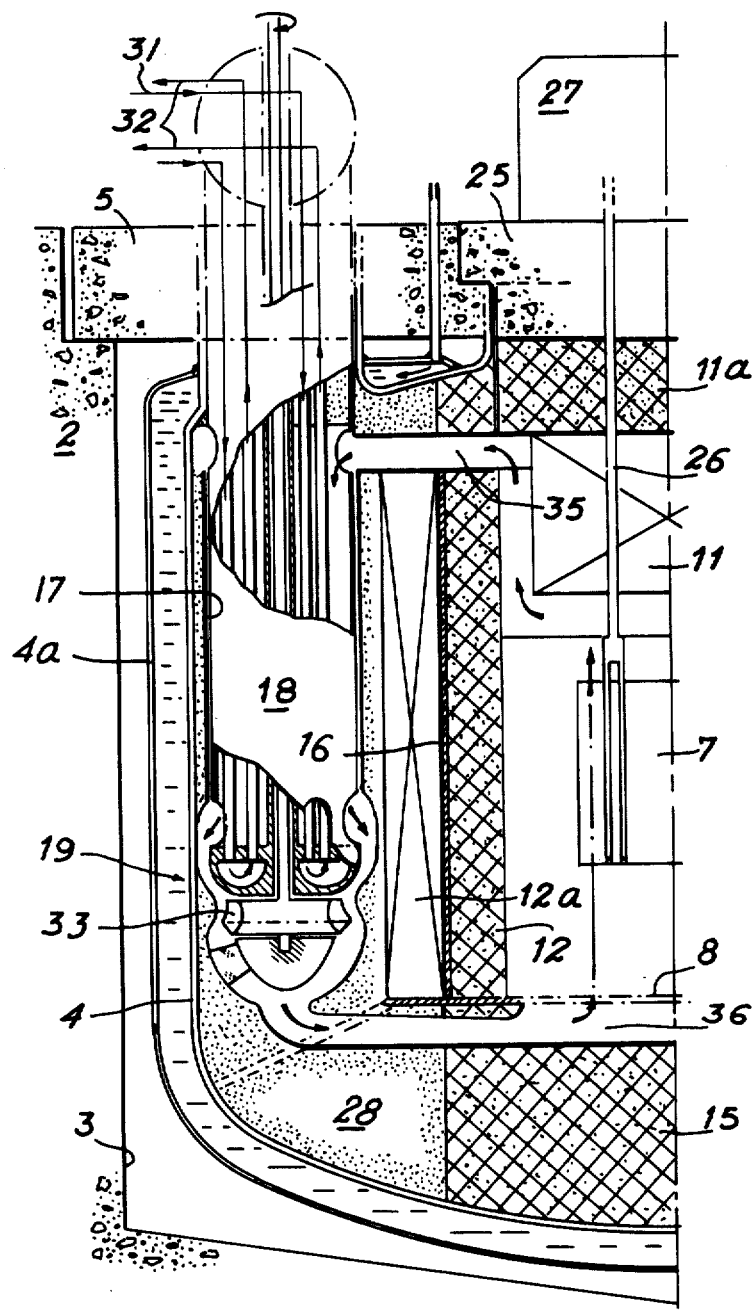
FIG. 2 is a sectional view of an alternative embodiment of the reactor under consideration.

In an alternative embodiment illustrated in FIG. 2, the molten-salt flow path between the heat exchangers and the pumps may be reduced to a further extent by making provision directly within the annular region formed between the vessel and the reactor core for pump-exchanger units in which one pump is mounted directly beneath each heat exchanger and in the axis of this latter. From this figure, in which the reference numerals are identical to those adopted in FIG. 1, it is apparent that the fuel salt flow path in the hot portion of the primary circuit between the reactor core 7 and the heat-exchanger inlet 18 can be reduced to radial ducts 35 whilst the return of the cold fuel salt discharged by the impellers 33 of the pumps 19 is carried out by means of further ducts 36 which extend radially from said pumps to the center of the reactor core. The expanded graphite 28 which fills the free spaces around the ducts 35 and 36 is compacted to a suitable density. Positioning of the material can be carried out by introducing a number of formwork elements into the reactor vessel which is still empty. Said formwork elements define the volumes of the reactor core, the heat exchangers, the pumps and the connecting ducts, the expanded graphite being then tamped around these components. On completion of the packing operation, the formwork elements are removed in order to leave the necessary space for mounting the corresponding portions of the installation.

In either of the two alternative embodiments contemplated in the foregoing, the molten-salt reactor under consideration has a fully integrated primary circuit within the core containment vessel. By means of this constructional arrangement, the protection of the structures of said primary circuit from neutron radiations need only be considered in relation to the fact that the fuel salt itself is a source of neutrons. This necessarily results in activation of these structures which must be designed and positioned accordingly since their integrated fluence must remain compatible with their mechanical strength. On the other hand, the arrangements provided for limiting the flow path of the hot molten fuel salt between the reactor core outlet and the primary heat exchangers reduce the risks of corrosion to a considerable extent. In fact, the hot molten salt is in contact with only a very small portion of the core structures and the primary circuit whereas the greater part of this latter is in contact with the cold fuel salt.

Figure 3:
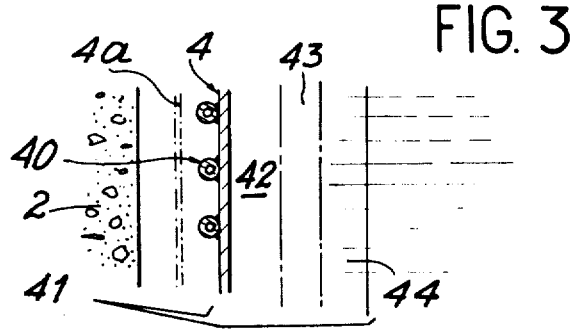
FIG. 3 illustrates to a larger scale a detail of the reactor vessel wall in either of the two alternative embodiments aforementioned.

In order to limit the effects of the fuel salt in contact with the core structures, it can be particularly advantageous as illustrated in FIG. 3 to "condition" the reactor vessel so as to carry out external cooling of the vessel wall in the regions which are in contact with the salt. To this end, there can be associated with said wall a separate cooling circuit for a suitable fluid combined within the vessel with a perforated heat-insulating structure 41 of a type which is known per se. By virtue of these arrangements, there is formed in contact with the vessel 4 a zone 42 in which the fuel salt is solidified followed by a phase-change zone 43 and finally by a zone 44 in which the liquid salt is again present, the solid layer thus deposited being such as to insulate the vessel wall from the circulating salt. The corrosive action of the molten salt is therefore reduced even further, with the result that the vessel can be constructed of ordinary steel and not of special steel which is both costly and more difficult to machine.

The formation of said solidified salt layer on the internal surface of the reactor vessel can be carried out in the following manner. When the vessel has been completely filled with expanded graphite and fuel salt, the entire assembly is heated to a temperature above that of the melting point of the eutectic compound constituted by the neutral elements of the fuel salt consisting for example of a mixture of lithium and beryllium. This temperature is equal, for example, to 400° C if the liquidus temperature of the salt is of the order of 350° C and the neutral constituents of the salt are thus permitted to fill the free spaces which may have been left as a result of differential expansions between the reactor vessel and the expanded graphite which has been compacted within said free spaces. In the following stage, the vessel is cooled to below the point of solidification of the eutectic compound, for example to 300° C. When the entire quantity of salt which fills the spaces between the reactor vessel and the graphite has solidified, the vessel is drainedout, whereupon the reactor core is filled with the active components of the fuel salt which are necessary for the reaction while maintaining the reactor vessel at 300° C. Conditioning of the vessel wall at 300° C is then maintained by the circuit 40 throughout the operation of the reactor so as to prevent the fuel salt from coming into contact with the reactor vessel whereas this latter is continuously insulated by means of the zones 42 and 43. It is readily apparent that, if it is found desirable for any reason to replace the protective layer, it will only be necessary to increase the conditioning temperature to 400° C in order to remove all the salt, then again to carry out the operations mentioned above. It should be noted in addition that the conditioning explained in the foregoing does not entail a high degree of fine control since the inertia of this system is in fact particularly high and variations of plus or minus 25° C are not objectionable. Regulation of the conditioning can in any case be obtained simply by controlling the pressure of steam produced within the heat exchangers which are heated by the conditioning fluid within the circuit 40.

In all cases, the integration of the primary circuit within the reactor vessel in conjunction with a volume of fuel salt which is substantially equal to or smaller than that of known external-loop systems permits better accessibility to the different circuit components for both maintenance and possible replacement, these components being grouped together in a single location in which the necessary handling means can more readily be concentrated.

It is wholly apparent that the invention is not limited solely to the examples of construction which have been described in the foregoing with reference to the drawings but extends to all alternative forms.

What we claim is:

1. A molten-salt reactor provided within a common vessel containing the reactor core and a neutron-moderating mass pierced by passages for the circulation of the molten fuel salt with at least one primary heat exchanger which is located as close as possible to the reactor core and through which the hot fuel salt passes immediately after discharge from said core and with pumps for circulating the cold molten fuel salt which is discharged from the heat exchangers and returned into the reactor core, wherein the free spaces defined within the reactor vessel exterior of and between the core, the heat exchangers and the pumps are filled with expanded graphite which is compatible with the molten fuel salt except for the connecting passages in which the fuel salt is circulated, wherein the reactor core is placed within the central portion of an open vessel having a vertical axis and is surrounded by a lateral reflector which defines an annular region with the internal vessel wall, the pumps for the circulation of molten fuel salt and the heat exchangers being placed within said annular region, said pumps and said heat exchangers being disposed at intervals around said reactor core.

2. A molten-salt reactor according to claim 1, wherein the pumps and the heat exchangers are suspended within the annular space beneath a horizontal vault roof extending above the reactor vessel, said vault roof being provided with a central access opening placed opposite to the reactor core and closed by a removable shield plug.

3. A molten-salt reactor according to claim 1, wherein each circulating pump is mounted directly beneath a heat exchanger within the annular space so as to constitute a pump-exchanger unit, the passages providing a connection with the reactor core being constituted by ducts extending radially from the axis of the reactor vessel and placed in the top and bottom portions of said reactor core.

4. A molten-salt reactor according to claim 1, wherein the reactor vessel wall is provided with an internal heat insulation and an external cooling circuit which is capable of producing partial solidification of the fuel salt in contact with said wall so as to limit the effects of corrosion by the circulating molten salt.

* * * * *